(12) United States Patent
Neese et al.

(10) Patent No.: US 9,701,368 B2
(45) Date of Patent: Jul. 11, 2017

(54) SEAT AND SEAT BACK ASSEMBLY

(71) Applicant: Grady-White Boats, Inc., Greenville, NC (US)

(72) Inventors: David A. Neese, Greenville, NC (US); Daniel Strickland, Greenville, NC (US)

(73) Assignee: Grady-White Boats, Inc., Greenville, NC (US)

( * ) Notice: Subject to any disclaimer, the term of this patent is extended or adjusted under 35 U.S.C. 154(b) by 209 days.

(21) Appl. No.: 14/580,591

(22) Filed: Dec. 23, 2014

(65) Prior Publication Data

US 2015/0183494 A1 Jul. 2, 2015

Related U.S. Application Data

(60) Provisional application No. 61/922,252, filed on Dec. 31, 2013.

(51) Int. Cl.
| | | |
|---|---|---|
| *B63B 29/04* | (2006.01) | |
| *B60N 2/22* | (2006.01) | |
| *A47C 1/024* | (2006.01) | |
| *B60N 2/30* | (2006.01) | |

(52) U.S. Cl.
CPC .......... *B63B 29/04* (2013.01); *B60N 2/3009* (2013.01); *B63B 2029/043* (2013.01)

(58) Field of Classification Search
CPC . B63B 29/04; B63B 2029/043; B60N 2/3009; B60N 2/3011; B60N 2/3013
USPC ............................................ 297/377, 354.13
See application file for complete search history.

(56) References Cited

U.S. PATENT DOCUMENTS

| | | | | |
|---|---|---|---|---|
| 5,425,567 A * | 6/1995 | Albecker, III | ......... | A47C 1/146 297/377 |
| 6,412,870 B1 * | 7/2002 | Higgins | ................... | B60N 2/34 297/342 |
| 6,681,713 B2 * | 1/2004 | Scott | ....................... | B63B 17/02 114/361 |
| 6,692,076 B1 * | 2/2004 | Burer | ....................... | A47C 7/56 297/331 |
| 6,715,440 B2 * | 4/2004 | Biedenweg | ............. | B63B 29/02 114/343 |
| 6,945,190 B1 * | 9/2005 | Frandsen | ................ | B63B 19/19 114/363 |
| 7,255,058 B2 * | 8/2007 | Forbes | .................. | B63B 25/002 114/363 |
| 8,028,641 B1 * | 10/2011 | Sly | ........................ | B63B 27/146 114/362 |
| 2007/0158986 A1 * | 7/2007 | Adams | ..................... | B60N 2/36 297/342 |

(Continued)

*Primary Examiner* — David R Dunn
*Assistant Examiner* — Tania Abraham
(74) *Attorney, Agent, or Firm* — Olive & Olive, P.A.

(57) ABSTRACT

A seat and seat back assembly includes a seat back moveable between an upright position and a horizontal position. A support panel is connected to the seat back for pivoting movement of the support panel between a first position supporting the seat back upright, and a second position wherein the seat back is moveable into the horizontal position. A biasing mechanism serves to urge the support panel into the first position when the seat back is moved into an upright position. When the support panel is moved into the second position this allows the seat back assembly to move into the horizontal position without dropping unrestricted.

12 Claims, 13 Drawing Sheets

(56) References Cited

U.S. PATENT DOCUMENTS

2008/0066672 A1\* 3/2008 Eekhoff ................. B63B 29/04
                                                        114/363
2010/0176639 A1\* 7/2010 Balgaard ................. A47C 7/66
                                                       297/354.13

\* cited by examiner

SEAT AND SEAT BACK ASSEMBLY

CROSS REFERENCE TO RELATED APPLICATIONS

This application is related to and claims priority to Provisional Application Ser. No. 61/922,252 filed Dec. 31, 2013. The disclosure of Provisional Application Ser. No. 61/922,252 is specifically incorporated by reference in its entirety herein.

FIELD OF THE INVENTION

This invention relates to a seat and seat back assembly, which is easy to convert between the seat back being reclined to present a horizontal surface, into a vertical upright seat back arrangement in an easy and simple to operate manner. More particularly, the invention relates to such a seat and seat back assembly which is especially adapted for use on boats in marine environments.

BACKGROUND

Seats on some boats are convertible between a seat arranged, or configured, for seating, with an upright seat back, which can be moved into a horizontal position for standing on the surface of the seat back, allowing someone to fish from the surface, or to be used as a lounging area. Generally such seats have a manual hinged arrangement for raising the seat back and locking it into an upright position with a mechanical locking mechanism, and for releasing the mechanical locking mechanism and allowing the seat back to be lowered into a horizontal position. Further, such seats typically have cushioned surfaces in the form of cushions that can be snapped on both the seat back and the horizontally extending seat bottom such that when it becomes desirable to go fishing, the seat back cushion and seat cushion merely need to be unsnapped and removed to provide a solid standing surface, or if not used for fishing can remain in place to form a lounge.

The problem with these mechanical arrangements is that a boating environment is often unstable, with the boat rocking due to wave action. In such a case it may become difficult to easily transform the seat from an upright seat back configuration to a horizontal configuration, or vice versa. Oftentimes converting the seat back from one position to the other can be clumsy even to the point of risking injury from the moving parts, especially in the dynamic environment of unpredictable movement experienced on a boat.

In accordance with one aspect of the invention, the problems associated with the prior art seat arrangements, in particular seat arrangements for boats, are overcome.

BRIEF SUMMARY

In one exemplary embodiment, a seat back assembly is provided. The seat back assembly includes a seating surface (seat) and seat back moveable between a generally upright position and a generally horizontal position. By the terms "generally horizontal" and "horizontal" are meant sufficiently horizontal to stand or lie on the surface in a stable manner. By the terms "generally upright" and "upright" are meant sufficiently upright to support a person's back when seated, and can range from fully vertical to various levels of reclining. A support panel is connected in a hinged manner to the seat back for a pivoting movement of the support panel between a first position supporting the seat back upright, and a second position wherein the seat back is moveable into the horizontal position. A biasing mechanism serves to urge the support panel into the first position when the seat back is moved into an upright position, and when the support panel is moved into the second position, this allows the seat back to move into the horizontal position with a dampened, safe and controlled movement of the seat back without dropping in an unrestricted manner.

In a more specific aspect, the biasing mechanism is made up of two gas cylinders. A first gas cylinder is connected to the support panel at one end, and to the seat back at the other end, to cause the support panel to move into contact with a block to support the seat back in the upright position. Another gas cylinder connects to the seat back at one end and to the surface on which a seat associated with the seat back is supported to allow the seat back to move into the horizontal position with a controlled motion, as opposed to an abrupt motion, and without dropping in an unrestricted manner. An alternative biasing mechanism can involve spring mechanisms, such as spring loaded hinges, etc.

BRIEF DESCRIPTION OF THE DRAWING

Having briefly described the invention, the same will become better understood from the following description made with reference to the appended drawings wherein.

DETAILED DESCRIPTION OF ILLUSTRATIVE EMBODIMENTS

Having briefly described the invention, the following is a description of exemplary embodiments of the invention.

As previously indicated, the invention relates to a seat and seat back assembly, more particularly, one especially adapted for use on a boat. In one exemplary embodiment, the seat and the seat back assembly may be located at the stern of the boat wherein it can function as a seat or alternatively, when converted so that the seat back is moved into a horizontal position, seat cushions can be removed, and the surfaces of the seat and seat back may be used as a platform for fishermen to stand on or to be used as a lounging area.

Figure 1:
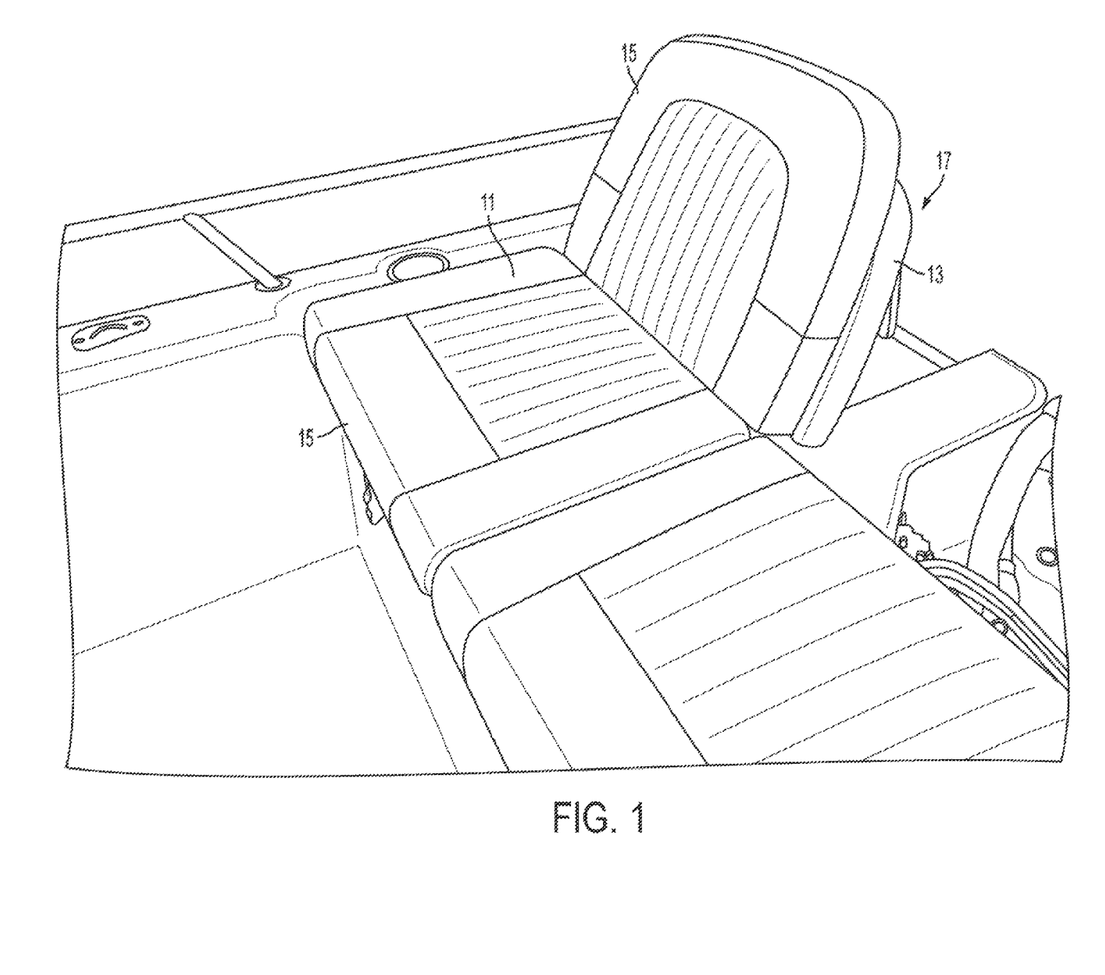
FIG. 1 is a perspective view of a seat having a seat back assembly in accordance with the invention, showing the seat back in an upright position.

As shown in FIG. 1, the seat back assembly 17 includes a seat 11 and a seat back 13, each having cushions 15 attached thereto, for example, through snap buttons.

Figure 2:
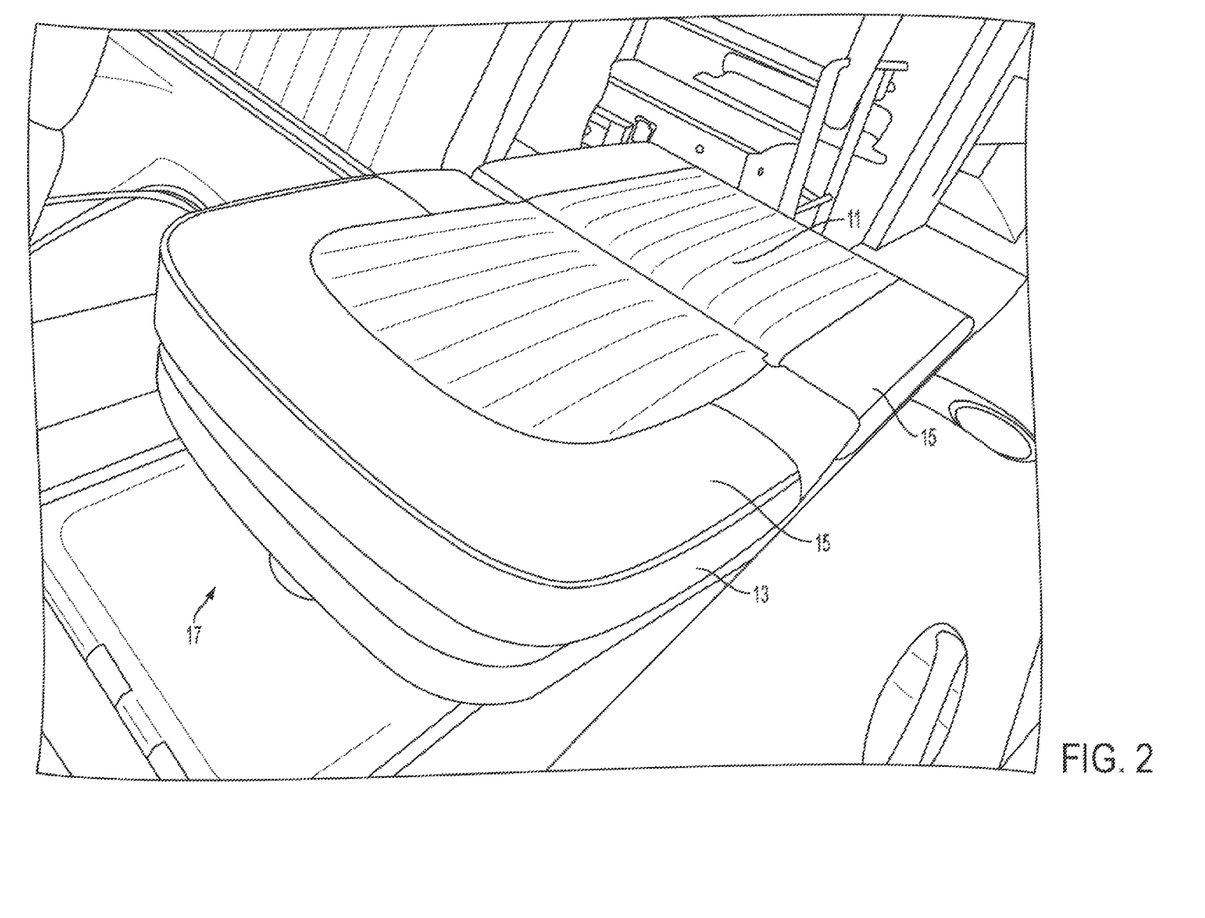
FIG. 2 is a perspective view of the seat and the seat back of FIG. 1 showing the seat back in a horizontal position.

FIG. 2 illustrates the seat back assembly 17 in accordance with the invention with the seat back 13 shown in a horizontal position with the cushions 15 still attached thereto.

Figure 3:
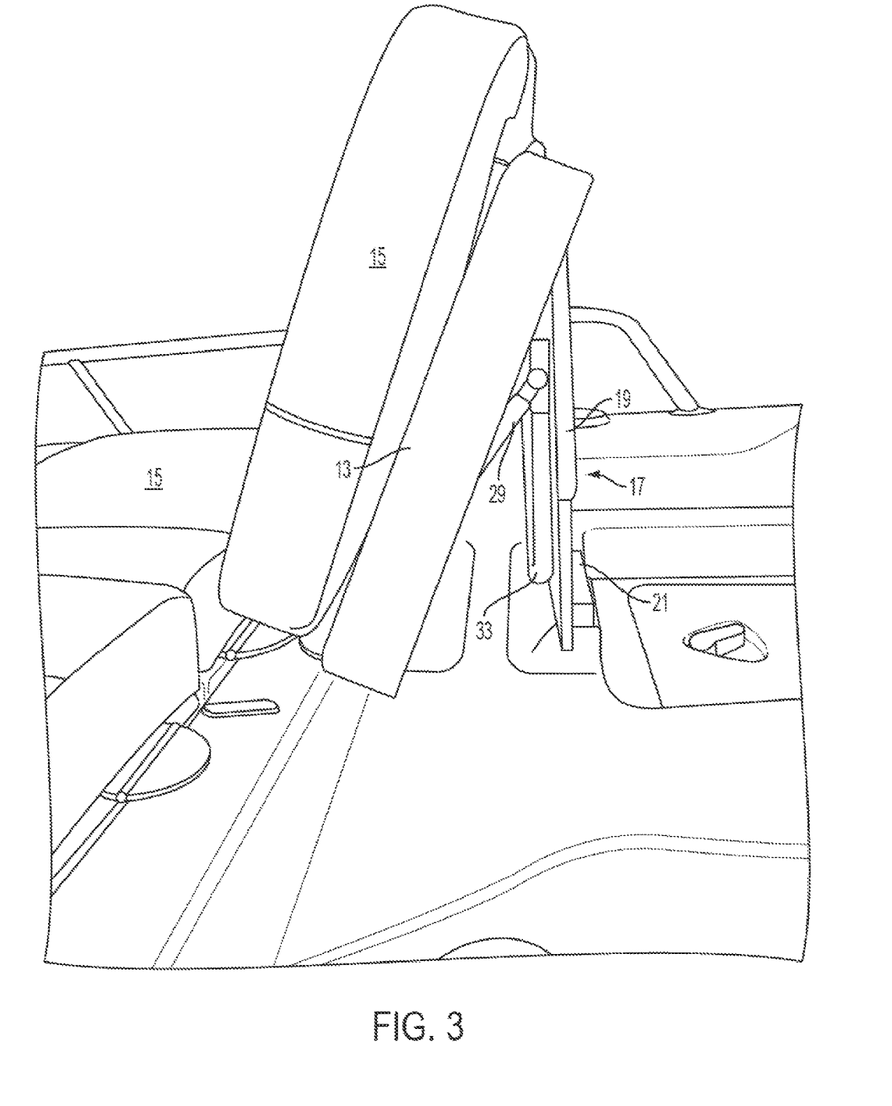
FIG. 3 is a side view of the seat back assembly shown with a support panel in locking position to prevent the seat back from moving into a horizontal position.

FIG. 3 illustrates the seat back assembly 17 shown with the seat back 13 in a relatively upright position, with a support panel 19 shown in engagement with a block 21 for holding the seat back 13 in the upright position. A reinforcing tubular member 33 is attached to the support panel 19 to provide rigidity or stiffness to the support panel 19. Alternatively, a more rigid material, such as aluminum, can be used to manufacture the support panel 19 to eliminate the need for the tubular member 33. Also shown is a gas cylinder 29 which is connected to the reinforcing tubular member 33 on the support panel 19, and to the seat back 13, to urge the support panel 19 into engagement against the block 21 to secure the seat back 13 upright.

Figure 4:
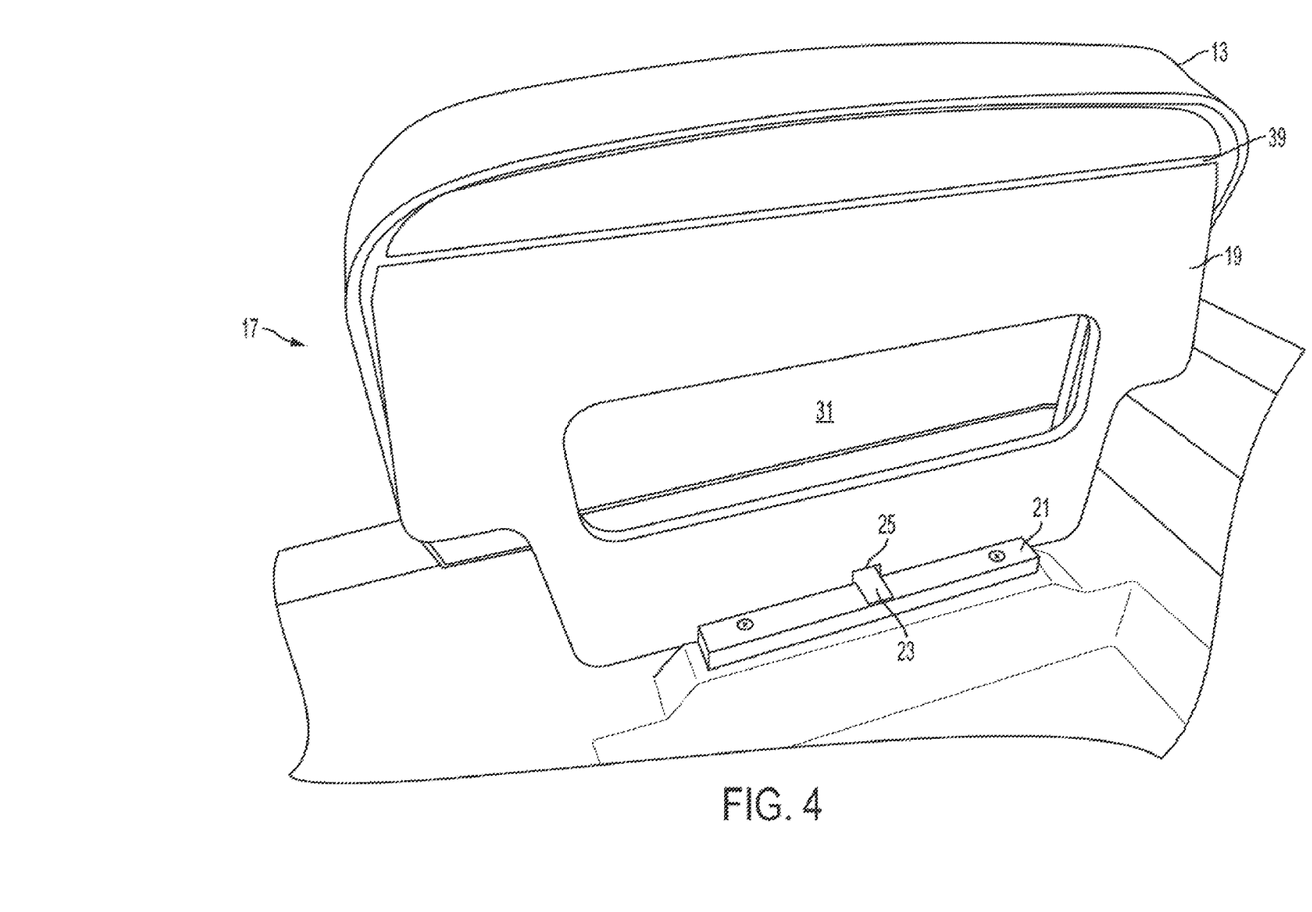
FIG. 4 is a perspective view from behind the seat showing the seat back in an upright position with a support panel shown engaged against a support block, and engaged with a slot of the support panel having a tab from the support block extending there through for more secure engagement.

FIG. 4 further illustrates how the support panel 19 maintains the seat back 13 in an upright position. The support panel 19 is connected to the seat back 13 at a hinged connection 39 to allow a pivoting movement of the support panel 19. The gas cylinder 29 serves to bias or urge the support panel 19 against the block 21 with a tab 23 of the block 21 passing into a slot 25 in the support panel 19. A cutout 31 allows the block 21 to be received within the cutout 31 as the seat back 13 is lowered, to allow the seat back 13 into a horizontal position, for example, on a surface of a boat upon which it is used.

Figure 5:
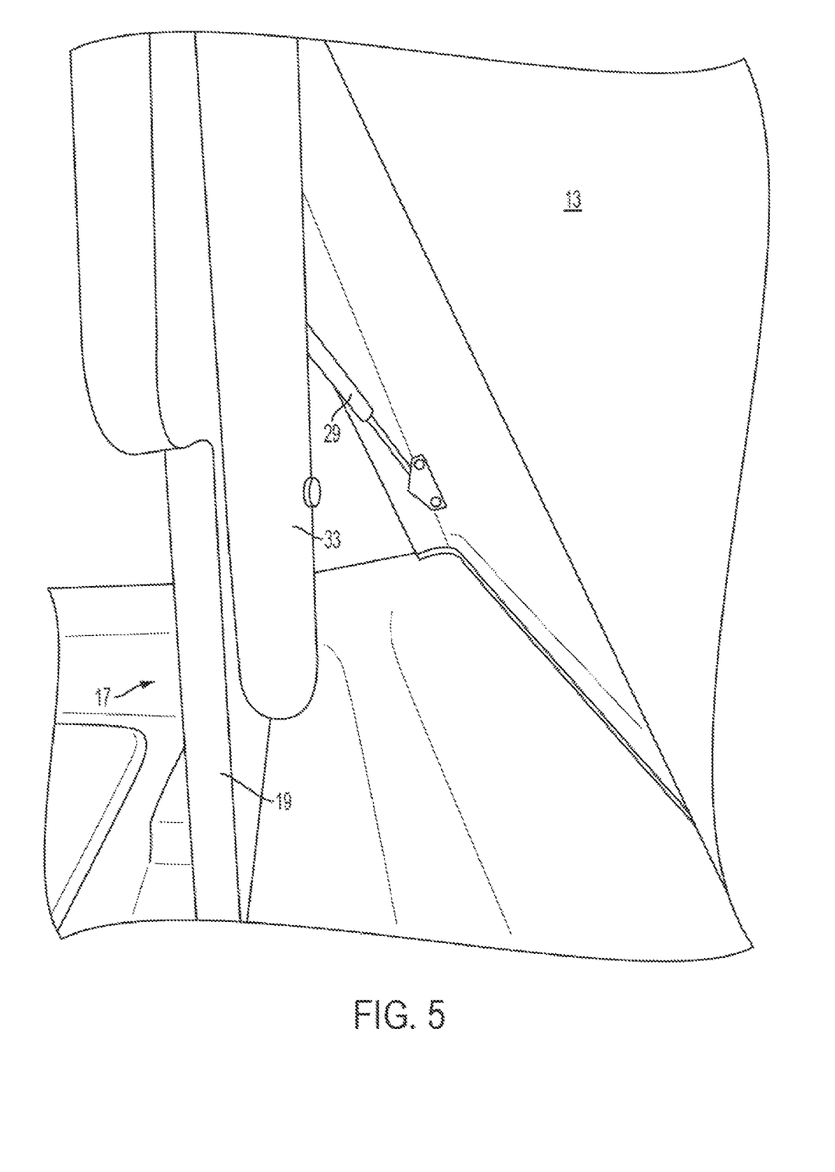
FIG. 5 is an enlarged side view showing the support panel in a position for holding the seat back in an upright position, and showing a gas cylinder engaged to the support panel for biasing the support panel to move into a position to support the seat back in an upright position.

FIG. 5 is an enlarged view from the side of the seat back 13 of the seat back assembly 17, shown with the reinforcing tubular support 33 having the gas cylinder 29 connected to the seat back 13 and to the support panel 19.

Figure 6:
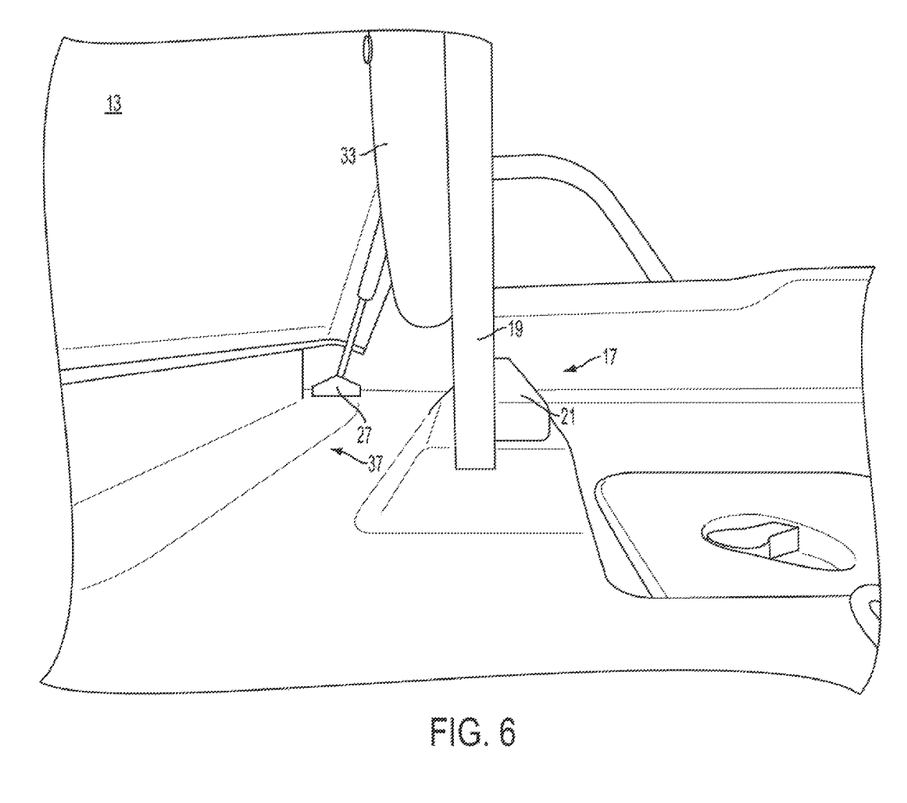
FIG. 6 is an enlarged side view from the other side of the view of FIG. 6 showing the support panel securing the seat back in an upright position, and also showing a gas cylinder, which serves to slow the movement of the seat back, against the pull of gravity, when it is being moved into a horizontal position.

FIG. 6 is a view from the other side of the view of FIG. 5 showing the support panel 19 abutting against the block 21 to support the seat back 13 in an upright position. Gas cylinder 27 is shown connected to a boat surface 37. The gas cylinder 27 serves to slow down, or dampen, the movement of the seat back 13 from the effects of gravity as it moves into horizontal position.

Figure 7:
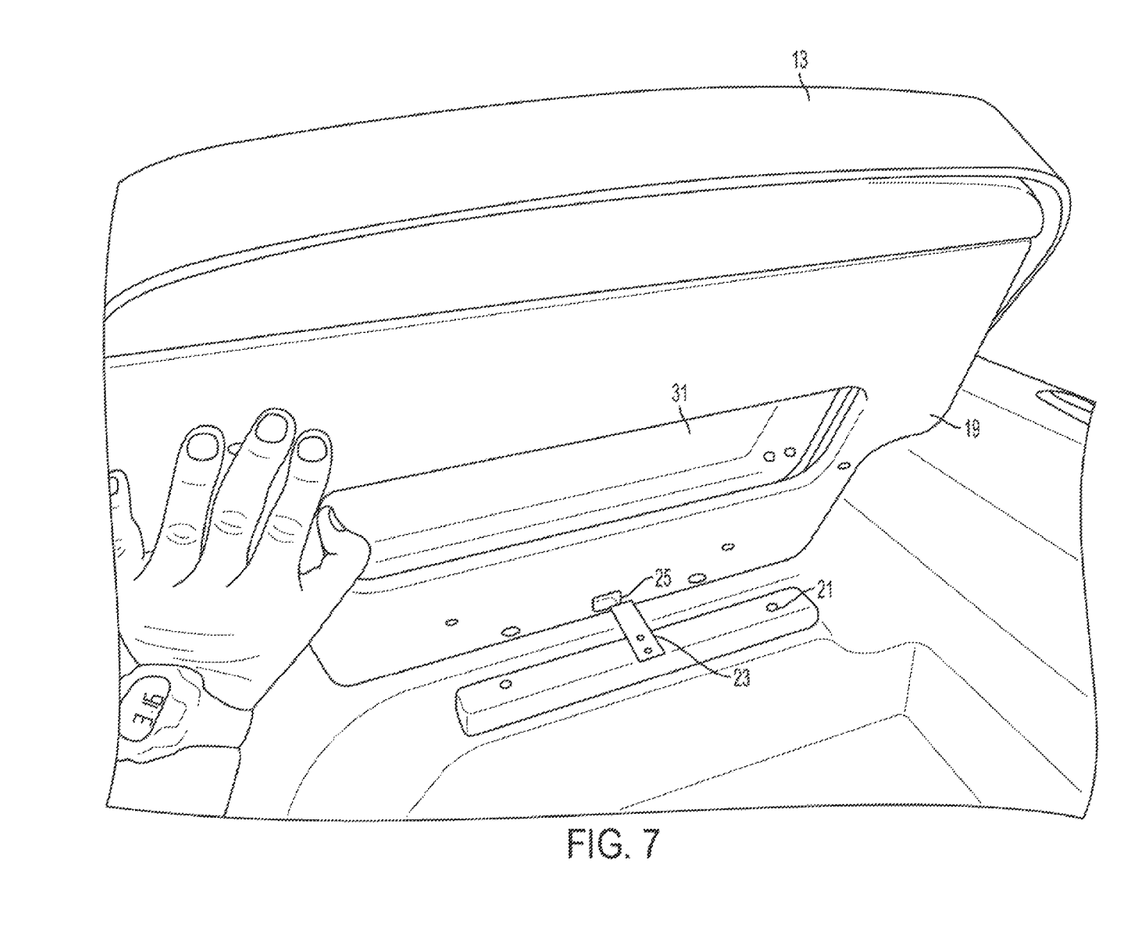
FIG. 7 is a perspective view from behind the seat showing how the support panel can be disengaged by pushing it towards the seat back to allow the seat back to begin to move into a horizontal position, dampened in movement to slow it down with a gas cylinder shown in a prior Figure.

FIG. 7 illustrates how the seat back 13 can be moved into a horizontal position by merely pressing, for example, with a hand on the support panel 19 to disengage the support panel 19 from the block 21, and the tab 23. To facilitate the operation of disengaging the support panel 19 from the block 21, a strap (not shown) may be added to the support panel 19. The tab 23 is disengaged from the slot 25 and the support panel 19 is moved toward the seat back 13 so that gravity causes the seat back 13 to move into a horizontal position without suddenly dropping, and with the movement slowed by the gas cylinder 27 (not shown).

Figure 8:
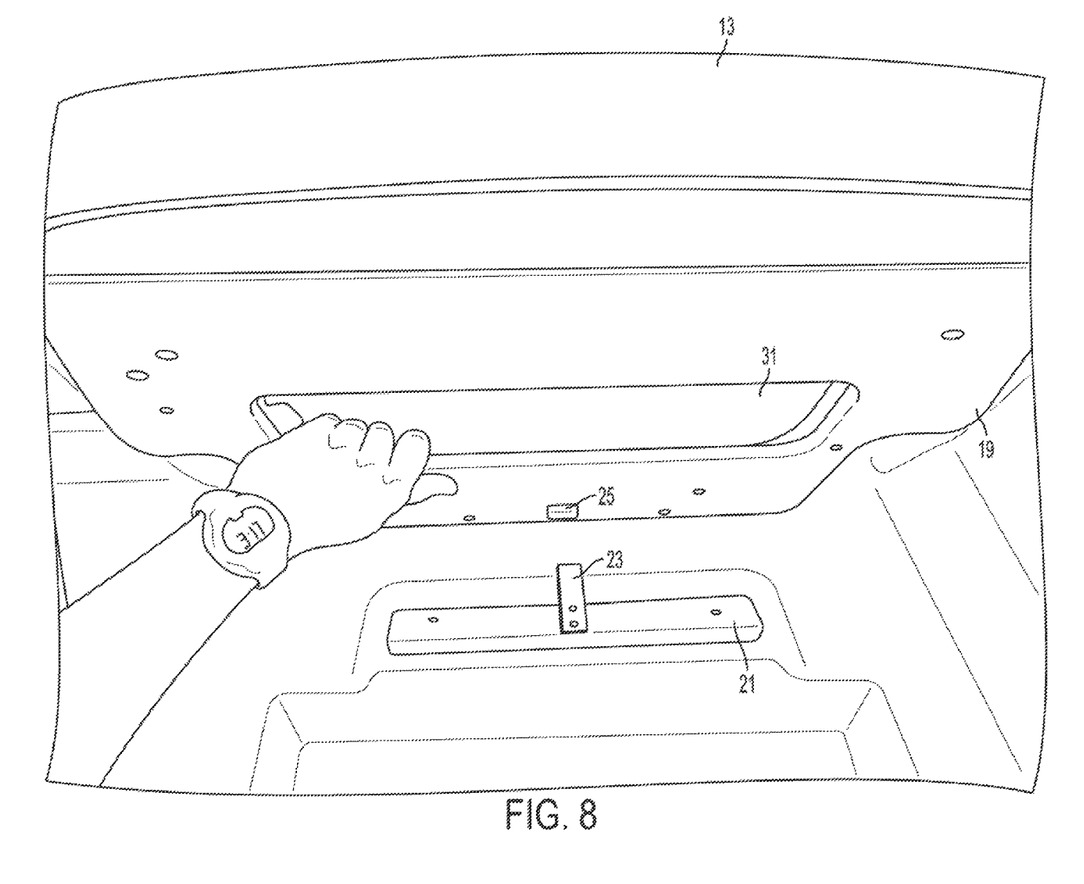
FIG. 8 is a perspective rear view illustrating how the seat back is raised into an upright position and how movement of the support panel can be initiated to have the gas cylinder associated for such movement for the support panel to move the support panel into engagement with a block and tab arrangement shown therein.

FIG. 8 is a view similar to FIG. 7, but showing a user pulling on the support panel 19 as the seat back 13 is moved into an upright position. In this case, gas cylinder 29 (not shown) serves to urge the support panel 19 into engagement with the block 21 and with the tab 23 and the slot 25.

Figure 9:
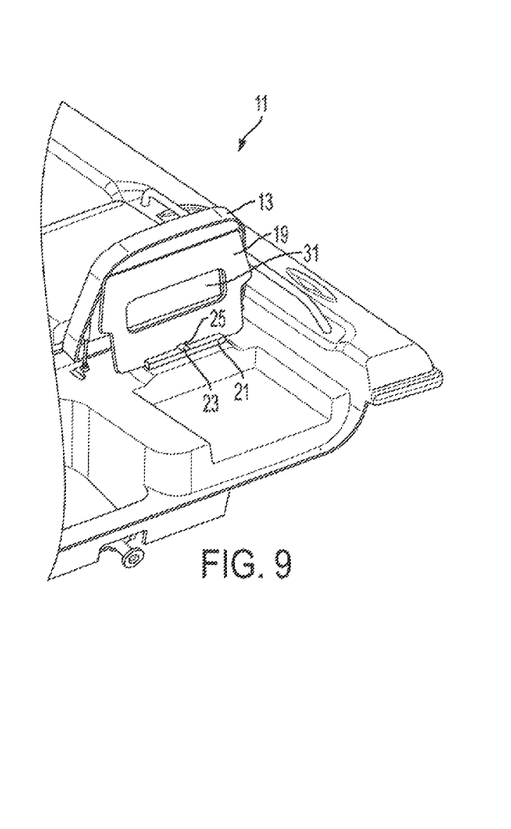
FIG. 9 is a perspective view showing the seat and seat back assembly of the invention mounted on a boat.
Figure 10:
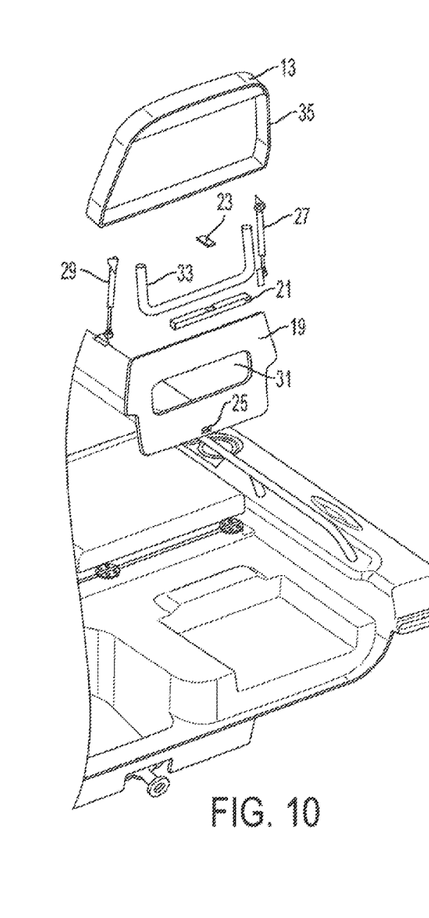
FIG. 10 is an exploded view of the seat back assembly of FIG. 9 in accordance with the invention.

FIG. 9 shows the seat 11 mounted on a boat. FIG. 10 is an exploded view of FIG. 9 showing of the various components of the seat back assembly 17 previously described herein.

Figure 11:
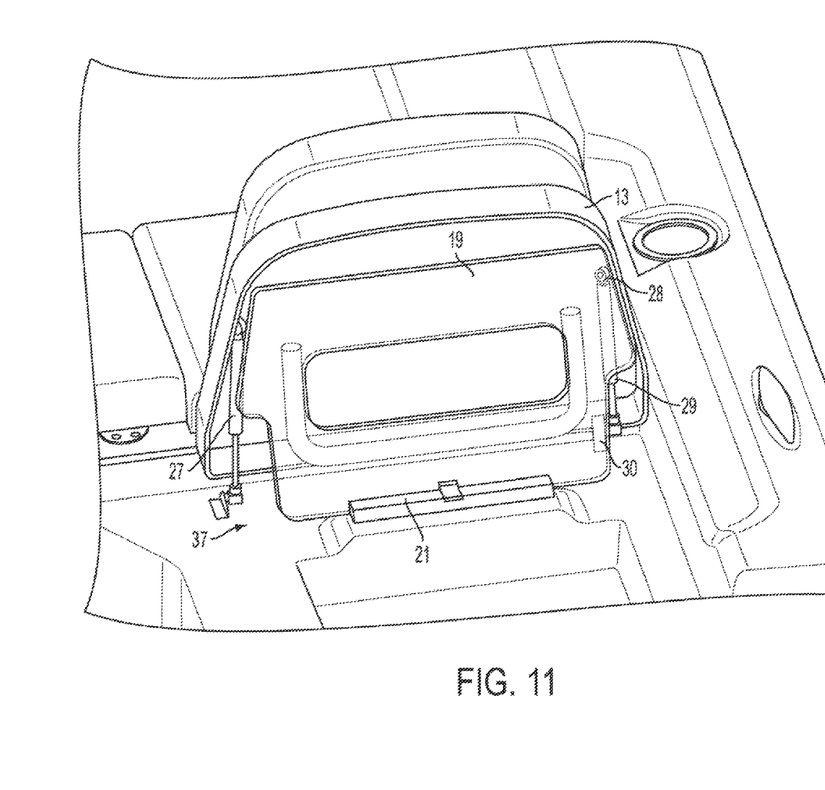
FIG. 11 is an alternate perspective view from the rear showing various components transparent to facilitate viewing of the seat back assembly.

FIG. 11 shows an alternative embodiment of the various components of the invention. The gas cylinder 27 has been moved from the outboard side toward inboard, and as before, is connected to the boat surface 37 at one end and the seat back 13 at its other end. The gas cylinder 29 has been moved toward the outboard side and is connected at a lower end 30 to the support panel 19, and at an upper end 28 to the seat back 13.

As before, the gas cylinder 27 serves to prevent the seat back 13 from falling unrestricted. The gas cylinder 29 biases the support panel 19 to move into contact with the block 21. Accordingly, it will be clear to those of ordinary skill that the gas cylinders 27 and 29 are opposingly biased with respect to each other.

As may be appreciated, while gas cylinders have been shown as used to provide a biasing mechanism to cause movement to the various components of the seat back assembly 17, these components can be readily substituted by other types of dampening mechanisms, illustrative examples of which can be spring assemblies or other like devices.

Figure 12:
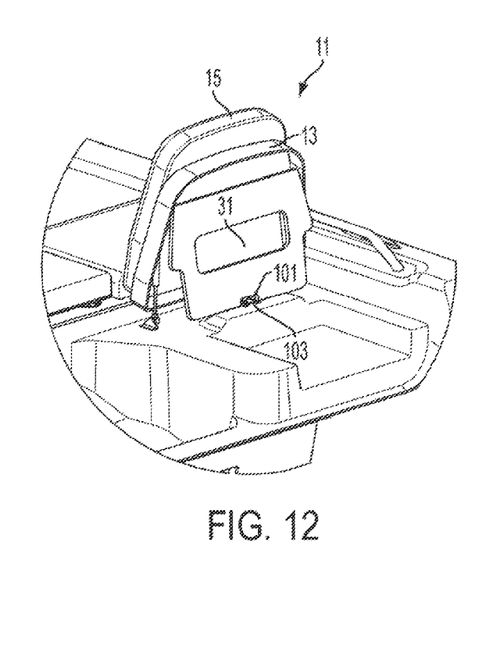
FIG. 12 is a view as in FIG. 9 illustrating an alternative embodiment of the seat back assembly.
Figure 13:
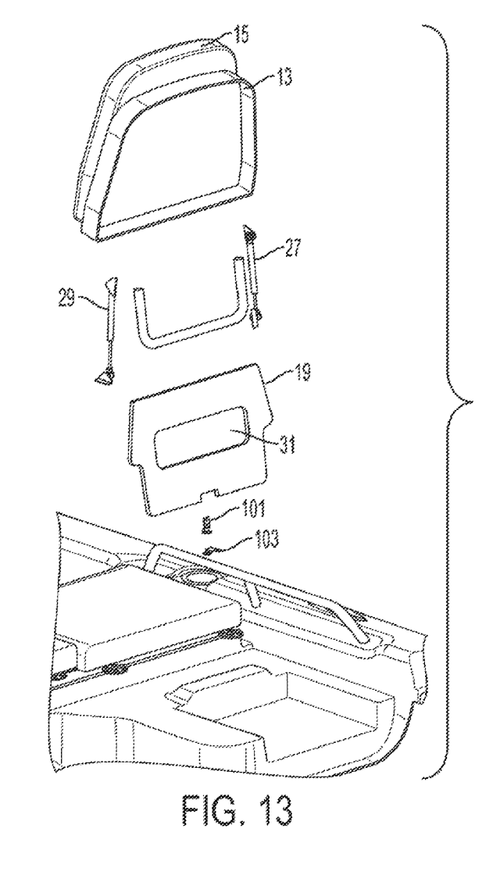
FIG. 13 is a view as in FIG. 10 illustrating the alternative embodiment of the seat back assembly of FIG. 12 in exploded view.
Figure 14:
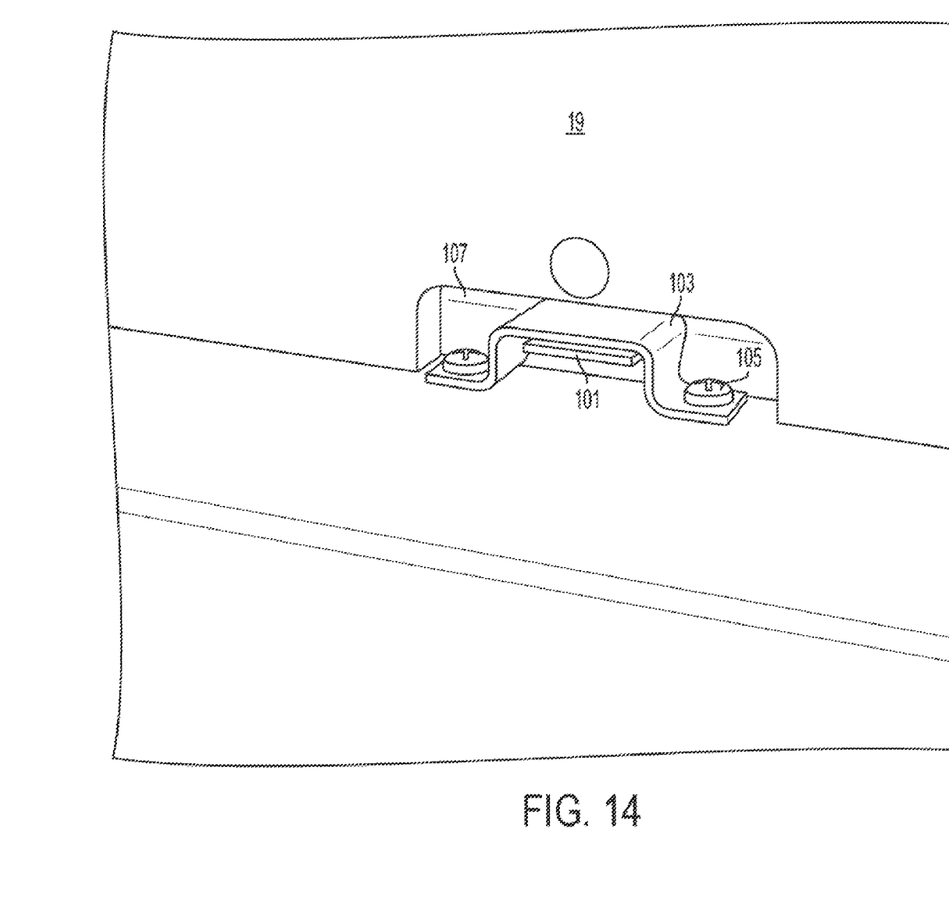
FIG. 14 is a perspective view of the L-shaped member and a receiving member of the embodiment of FIGS. 12 and 13.
Figure 15:
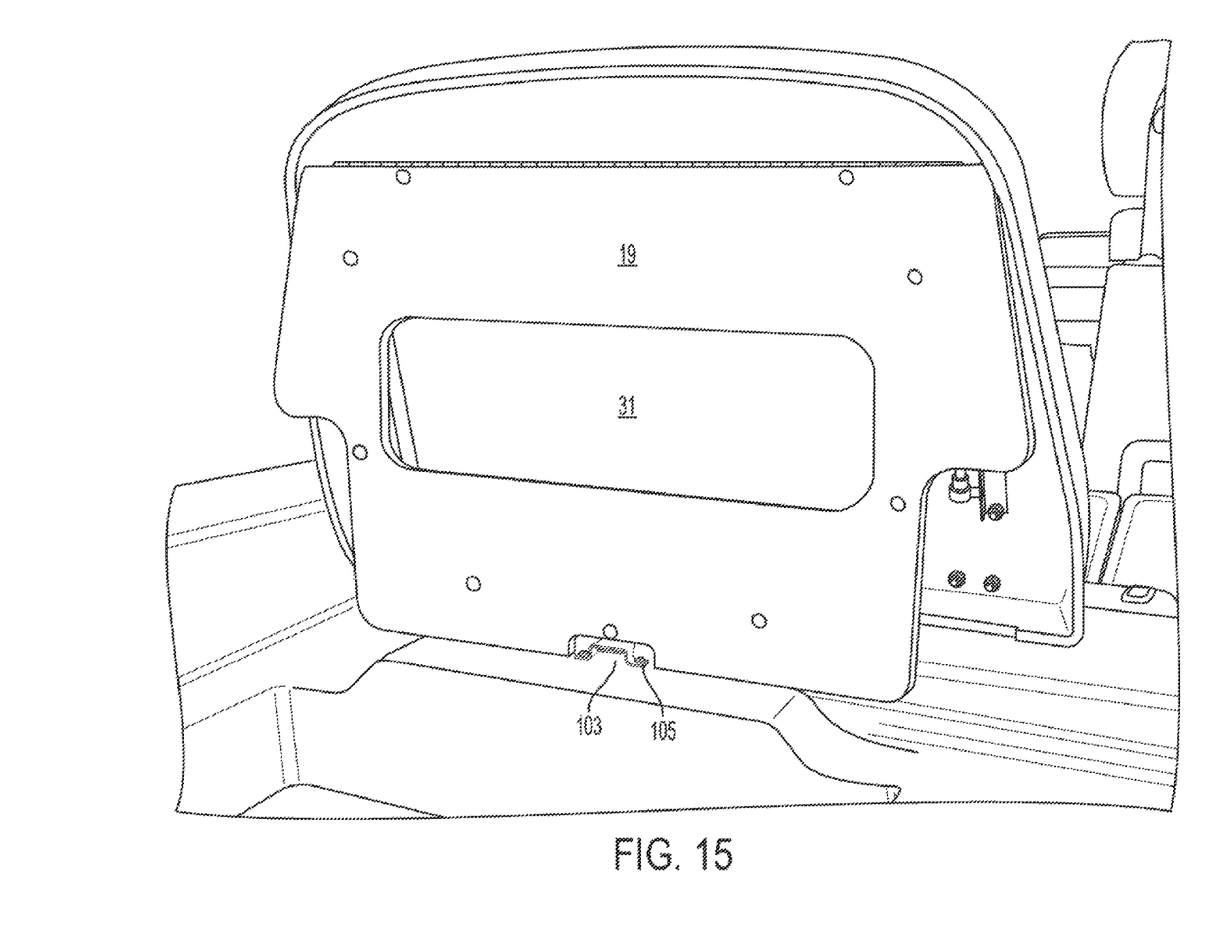
FIG. 15 is a perspective view from the rear of the seat back assembly of the embodiment of FIGS. 12 and 13 in an upright position.

In a further illustrative embodiment of the invention as shown in FIGS. 12 and 13, the block 21 and tab 23 and slot 25 are replaced. As shown in FIGS. 12 and 13, as well as in FIGS. 14 and 15, an L-shaped, preferably metal, member 101 can be attached flush to the side of panel 19 facing seat back 13. Instead of having the block 21, a generally U-shaped member 103, preferably also made of metal, is attached directly onto the surface of the boat deck through screws 105. The other leg portion of the L-shaped member 101 projects through an opening 107 in the panel 19 passing through a U-shaped opening defined by the U-shaped member 103 to thereby prevent the seat back 13 from moving further aft when in an upright position.

One practical advantage of the invention is that it provides a convenient and practical mechanism for lowering and raising a seat back on a boat in a manner which is controlled, safe, and prevents slamming of components thereof. Thus, the foregoing discussion outlines some of the more important features of the invention to enable a better understanding of the invention and to instill a better appreciation of the inventors' contribution to the art. It must be clear that the disclosed details of construction, descriptions of geometry and illustrations of invented concepts are mere examples of possible manifestations of the invention. Similarly, materials selected for construction of the invention may take many forms, such as metals such as stainless steel for the gas cylinders, plastics, fiberglass, composites, etc.

Although the invention has been shown and described with reference to certain and illustrative embodiments, those skilled in the art will undoubtedly find alternative embodiments obvious after the reading of this disclosure. With this in mind, the following claims are intended to define the scope of protection to be afforded the inventors, and those claims shall be deemed to include equivalent constructions insofar as they do not depart from the spirit and scope of the present invention.

What is claimed is:

1. A seat back assembly, comprising:
   (a) a seat back moveable between an upright position and a horizontal position;
   (b) a support panel connected to the seat back for pivoting movement of the support panel between a first position supporting the seat back upright, and a second position wherein the seat back is moved into said horizontal position;
   (c) a biasing mechanism for urging the support panel into the first position when the seat back is moved into the upright position, and when the support panel is moved into the second position, for allowing the seat back to move into the horizontal position with a controlled motion, and said biasing mechanism comprising a pair of biasing mechanisms, each one of the pair being opposingly biased relative to the other, and
   (d) a block for having the support panel abut against the block when the seat back is in the upright position to hold the seat back in the upright position.

2. The seat back assembly of claim 1, wherein said biasing mechanism comprises a first gas cylinder connected to the support panel at one end, and to the seat back at another end, to urge the support panel to move into contact with the block to support the seat back in the upright position.

3. The seat back assembly of claim 2, wherein said biasing mechanism further comprises another gas cylinder connected to the seat back at one end and to a surface on which a seat associated with the seat back is supported, said another gas cylinder being biased to allow the seat back to move into the horizontal position with a controlled motion by dampening the effects of gravity on the seat back motion.

4. The seat back assembly of claim 1, further comprising a horizontally extending seat having said seat back pivotally connected thereto.

5. The seat back assembly of claim 1, wherein the seat back has a cushion removably attached thereto.

6. A seat back assembly, comprising:
   (a) a seat extending horizontally;
   (b) a seat back pivotally connected to the seat;
   (c) the seat back being moveable between an upright position and a horizontal position;
   (d) a support panel connected to the seat back for pivoting movement of the support panel between a first position supporting the seat back in an upright position, and a second position wherein the seat back is moved into said horizontal position; and
   (e) a biasing mechanism for urging the support panel into the first position when the seat back is moved into the upright position, and when the support panel is moved into the second position, for allowing the seat back to move into the horizontal position with a controlled motion by dampening the effects of gravity on the seat back motion, and said biasing mechanism comprising a gas cylinder connected to the support panel at one end and to the seat back at another other end to cause the support panel to move into contact with a block to support the seat back in the upright position, and another gas cylinder connected to the seat back at one end and to a surface on which the seat is supported to allow the seat back to restrict movement as it moves into said horizontal position.

7. The seat back assembly as in claim 6, wherein the gas cylinders comprise a pair of biasing mechanisms, which are opposingly biased.

8. A seat back assembly, comprising:
   (a) a seat back movable between an upright position and a horizontal position;
   (b) a support panel connected to the seat back for pivoting movement of the support panel between a first position supporting the seat back upright, and a second position wherein the seat back is moved into said horizontal position; and
   (c) a biasing mechanism for urging the support panel into the first position when the seat back is moved into the upright position, and when the support panel is moved into the second position, for allowing the seat back to move into the horizontal position with a controlled motion, and said biasing mechanism comprising a first gas cylinder connected to the support panel at one end and to the seat back at another end, to urge the support panel to move into contact with a U-shaped member attached to a boat surface for receiving a leg of an L-shaped member attached to the support panel to extend through a U-shaped opening in the support panel to have the support panel abut against the U-shaped member and engage with the L-shaped member, and another gas cylinder connected to the seat back at one end and to a surface on which a seat associated with the seat back is supported, said another gas cylinder being biased to allow the seat back to move into the horizontal position with a controlled motion by dampening the effects of gravity on the seat back motion.

9. The seat back assembly of claim 8, further comprising a horizontally extending seat having said seat back pivotally connected thereto.

10. The seat back assembly of claim 8, wherein the seat back has a cushion removably attached thereto.

11. A seat back assembly, comprising:
    (a) a seat extending horizontally;
    (b) a seat back pivotally connected to the seat;
    (c) the seat back being moveable between an upright position and a horizontal position;
    (d) a support panel connected to the seat back for pivoting movement of the support panel between a first position supporting the seat back in the upright position, and a second position wherein the seat back is moved into said horizontal position;
    (e) a biasing mechanism for urging the support panel into the first position when the seat back is moved into the upright position, and when the support panel is moved into the second position, for allowing the seat back to move into the horizontal position with a controlled motion by dampening the effects of gravity on the seat back motion, and said biasing mechanism comprising a gas cylinder connected to the support panel at one end and to the seat back at another end to cause the support panel to move into contact with a block to support the seat back in the upright position, and (f) wherein said biasing mechanism comprises the gas cylinder connected to the support panel at one end and to the seat back at another end, to cause the support panel to move into contact with the block which comprises a U-shaped member attached to a boat surface for receiving a leg of an L-shaped member attached to the support panel and extending through a U-shaped opening of the support panel to have the support panel abut with the U-shaped member in a manner engaged against the L-shaped member.

12. The new seat back assembly of claim 11, wherein the seat back has a cushion removably attached thereto.

* * * * *